United States Patent
Eusebione et al.

(10) Patent No.: US 10,597,239 B2
(45) Date of Patent: Mar. 24, 2020

(54) TRANSFER SYSTEM FOR CONTAINERS

(71) Applicant: S.I.P.A. Societa' Industrializzazione Progettazione E Automazione, Vittorio Veneto (IT)

(72) Inventors: Ernesto Eusebione, Mareno di Piave (IT); Paolo Cavezzan, Ponte di Piave (IT); Daniele Chies, Mareno di Piave (IT); Matteo Zoppas, Conegliano (IT)

(73) Assignee: S.I.P.A. Societa' Industrializzazione Progettazione E Automazione S.P.A., Vittoria Veneto (IT)

( * ) Notice: Subject to any disclaimer, the term of this patent is extended or adjusted under 35 U.S.C. 154(b) by 0 days.

(21) Appl. No.: 16/093,446

(22) PCT Filed: Apr. 14, 2017

(86) PCT No.: PCT/IB2017/052169
§ 371 (c)(1),
(2) Date: Oct. 12, 2018

(87) PCT Pub. No.: WO2017/179022
PCT Pub. Date: Oct. 19, 2017

(65) Prior Publication Data
US 2019/0127156 A1 May 2, 2019

(30) Foreign Application Priority Data
Apr. 15, 2016 (IT) .............................. UA2016A2626

(51) Int. Cl.
*B65G 47/90* (2006.01)
*B65G 25/04* (2006.01)
(Continued)

(52) U.S. Cl.
CPC .......... *B65G 47/907* (2013.01); *B65G 25/04* (2013.01); *B65G 47/082* (2013.01); *B65G 47/846* (2013.01); *B65G 47/901* (2013.01)

(58) Field of Classification Search
CPC .. B65G 47/846; B65G 47/847; B65G 47/848; B65G 47/84; B65G 47/90; B65G 47/901; B65G 47/907; B65G 25/04; B65G 47/082
(Continued)

(56) References Cited

U.S. PATENT DOCUMENTS 3,805,943 A * 4/1974 Warren ................... B65B 23/08
198/412
4,199,049 A * 4/1980 Vamvakas ................ B08B 9/44
198/408
(Continued)

FOREIGN PATENT DOCUMENTS

CN 102001468 4/2011
CN 102101547 6/2011
(Continued)

*Primary Examiner* — James R Bidwell
(74) *Attorney, Agent, or Firm* — Stetina Brunda Garred & Brucker

(57) ABSTRACT

A transfer system for transferring thermoplastic material containers from a linear operating machine to a rotary operating machine having a first linear transfer device apt to pick the containers from the linear operating machine and to translate along a first axis to an exchange zone and vice versa, a wheel cooperating with the rotary operating machine peripherally provided with seats for the containers and apt to rotate about a second axis perpendicular to the first axis, at least one second linear transfer device apt to pick the container from the first linear transfer device in the exchange zone and to transfer them to the seats, the at least one second linear transfer device being apt to translate
(Continued)

parallel to the first axis from the exchange zone to an unloading zone proximal to the wheel and vice versa.

17 Claims, 8 Drawing Sheets

(51) Int. Cl.
*B65G 47/08* (2006.01)
*B65G 47/84* (2006.01)

(58) Field of Classification Search
USPC .......................................... 198/459.2, 468.3
See application file for complete search history.

(56) References Cited

U.S. PATENT DOCUMENTS

| | | | |
|---|---|---|---|
| 4,239,116 A | 12/1980 | Eisenberg et al. | |
| 6,131,721 A * | 10/2000 | Arakawa | H01L 21/67706 198/468.3 |
| 8,534,727 B2 * | 9/2013 | Weclawski | B65G 47/918 198/468.3 |
| 8,899,002 B1 | 12/2014 | Schwab | |
| 2013/0243895 A1 | 9/2013 | Zucche | |
| 2016/0297619 A1 * | 10/2016 | Hahn | B65G 47/082 |
| 2018/0297792 A1 * | 10/2018 | Triebel | B67C 7/0053 |

FOREIGN PATENT DOCUMENTS

| | | |
|---|---|---|
| DE | 102010035050 | 2/2012 |
| DE | 102014203421 | 8/2015 |
| EP | 1100725 | 5/2001 |
| EP | 2394917 | 12/2011 |
| EP | 2547611 | 1/2013 |
| EP | 2671825 | 12/2013 |
| EP | 2799349 | 11/2014 |
| GB | 2131376 | 6/1984 |

* cited by examiner

TRANSFER SYSTEM FOR CONTAINERS

CROSS REFERENCE TO RELATED APPLICATION(S)

The present application claims priority to PCT International Application No. PCT/IB2017/052169 filed on Apr. 14, 2017, which application claims priority to Italian Patent Application Nos. 102016000038971 filed Apr. 15, 2016, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a synchronous transfer system for transferring thermoplastic containers, in particular bottles, from a linear blowing machine to a rotary filling machine.

BACKGROUND

Containers made of thermoplastic material, such as PET bottles, are generally made by means of a blowing machine. Linear blowing machines are a commonly used type of blowing machine. After having been manufactured by the linear blowing machine, the containers are transferred to a filling machine, which is commonly of the rotary type, in which the containers are filled with a liquid.

A first problem of the known transfer systems is their complexity and their dimensions.

A further typical problem in a synchronous connection between a linear blowing machine and a rotary filling machine occurs in the frequent case of a difference between the blowing pitch and the filling pitch.

The pitch in a linear blowing machine is the center distance between one blowing cavity and the next cavity in the press, and is defined as a function of the size of the container, attempting to keep it as small as possible compatibly with the structural resistance of the walls of the mold.

The pitch of a rotary filling machine is the distance, along the periphery of a wheel of the filling machine, between a seat of a container to be filled and the next seat. Also in this case, the pitch is defined as a function of the size of the container, but typically it is a multiple of $\pi$, e.g. $p=(\pi D)/n$, where p is the pitch, n is the number of seats and D is the pitch diameter of the wheel of the filling machine.

In order to avoid this drawback of the difference of pitch between the blowing machine and the filling machine, connection belts are normally used between the two machines apt to create an accumulation of containers which, being no longer constrained to the blowing pitch of the blowing machine, may be loaded into the wheel of the filling machine.

Alternatively to the system for creating accumulations of bottles, a pitch changing system is used in synchronous applications to pass from the blowing pitch to the filling pitch and allow the containers to be loaded into the wheel or star of the filling machine having the same peripheral speed as the wheel of the filling machine in the exchange point. In such applications, the connection between the two machines is typically achieved by means of complex chuck chain systems for conveying the bottles.

However, the known solutions make the overall size of the transfer system disadvantageously too big and the system too complicated.

The need is thus felt for a transfer system which allows to solve the aforesaid problems.

SUMMARY OF THE INVENTION

It is a primary object of the present invention to provide a transfer system for transferring containers synchronously from a linear operating machine to a rotary operating machine in simpler and less cumbersome manner.

It is a further object of the present invention to provide a transfer system which, also in case of a difference between the blowing pitch and the filling pitch, makes it possible to perform the change of pitch simply, without needing accumulation means or other pitch changing systems.

The present invention achieves these and other objects which will be apparent in light of the present description by providing a transfer system of containers made of thermoplastic material from a linear operating machine to a rotary operating machine which comprises a first linear transfer device apt to pick the containers from the linear operating machine in a picking zone A and to translate along a first axis X from said picking zone A to an exchange zone B and vice versa, a wheel apt to cooperate with the rotary operating machine, peripherally provided with seats for the containers, and apt to rotate about a second axis Z perpendicular to the first axis X, at least one second linear transfer device apt to pick the containers from the first linear transfer device in said exchange zone B, and to transfer them to said seats, said at least one second linear transfer device being apt to translate parallel to said first axis X from the exchange zone B to an unloading zone C proximal to the wheel, and vice versa, wherein the first linear transfer device 2 is provided with retaining means 8, 108 for retaining the containers and the at least one second linear transfer device 12, 22, 112 is provided with gripping means 18, 28, 118 for picking the containers from corresponding retaining means 8, 108 in the exchange zone B, said retaining means 8, 108 being equally spaced apart by a first pitch equal to the pitch of said gripping means 18, 28, 118, wherein the seats 34 are equally spaced apart by a second pitch which is different from said first pitch, and wherein the seats 34 are shaped so that the periphery of wheel 32 has a sawtooth-shaped profile.

According to a further aspect, the invention also provides a method for transferring containers made of thermoplastic material from a linear operating machine to a rotary operating machine, the method comprising the following steps:

picking the containers from the linear operating machine in the picking zone A and transferring them along the first axis X from said picking zone A to the exchange zone B by means of the first linear transfer device, picking the containers from the first linear transfer device in said exchange zone B and transferring them, by means of the at least one second linear transfer device, to the seats of the wheel rotating about the second axis Z and cooperating with the rotary operating machine.

Advantageously, by providing at least one second linear transfer device between the exchange zone B and the unloading zone C, the dimensions are considerably reduced without needing to provide connection belts which create an accumulation of containers and without needing to provide systems and/or pitch changing operations, e.g. based on complex chuck chain conveyors.

More in particular, the conformation of the periphery, or outer edge of the wheel, makes it possible to transfer the containers directly, without intermediate means, from the at least one second linear transfer device to the wheel. Typically, the transfer device of the containers from the first linear transfer device to the at least one second linear transfer device also occurs directly, without intermediate means.

When two second linear transfer devices are provided, these work advantageously in alternating manner to provide a continuous and constant feeding flow to the wheel of the filling machine.

The first linear transfer device and/or the wheel can be components integrated in the linear blowing machine and in the filling machine, respectively.

Preferably, the transfer system is configured exclusively to transfer the containers from the linear operating machine to the rotary operating machine and not vice versa.

Preferably, the picking zone A, the exchange zone B and the unloading zone C are arranged in sequence parallel to axis X. More in particular, the zone downstream of the linear operating machine, e.g. a linear blowing machine, is in the picking zone A. The zone in which the rotary operating machine, e.g. a rotary filling machine, is arranged, and in particular the zone in which the wheel is arranged, is the unloading zone C. The exchange zone B is between the picking zone A and the unloading zone C.

The dependent claims describe preferred embodiments of the invention.

BRIEF DESCRIPTION OF THE FIGURES

Further features and advantages of the present invention will be more apparent in light of the detailed description of preferred, but not exclusive embodiments of a transfer system according to the invention. An example of method for transferring containers from one operating machine to another is also described. The description will be provided by way of non-limiting example, with reference to the accompanying drawings, also provided by way of non-limiting example, in which.

The same reference numbers in the figures identify the same elements or components.

DETAILED DESCRIPTION OF PREFERRED EMBODIMENTS OF THE INVENTION

Figure 1:
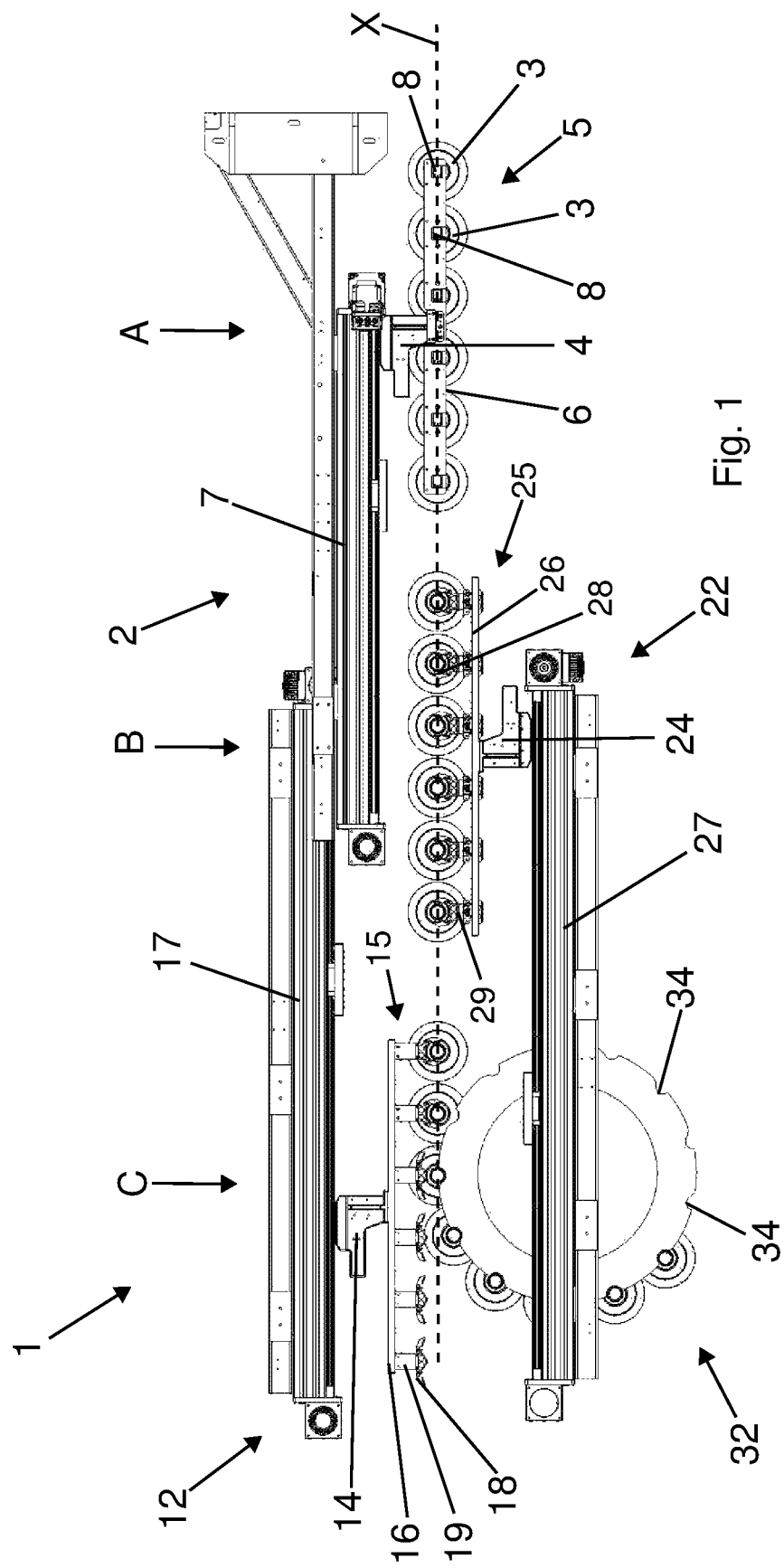
FIG. 1 shows a top view of a transfer system according to a first embodiment of the invention, in a first operating position.
Figure 2:
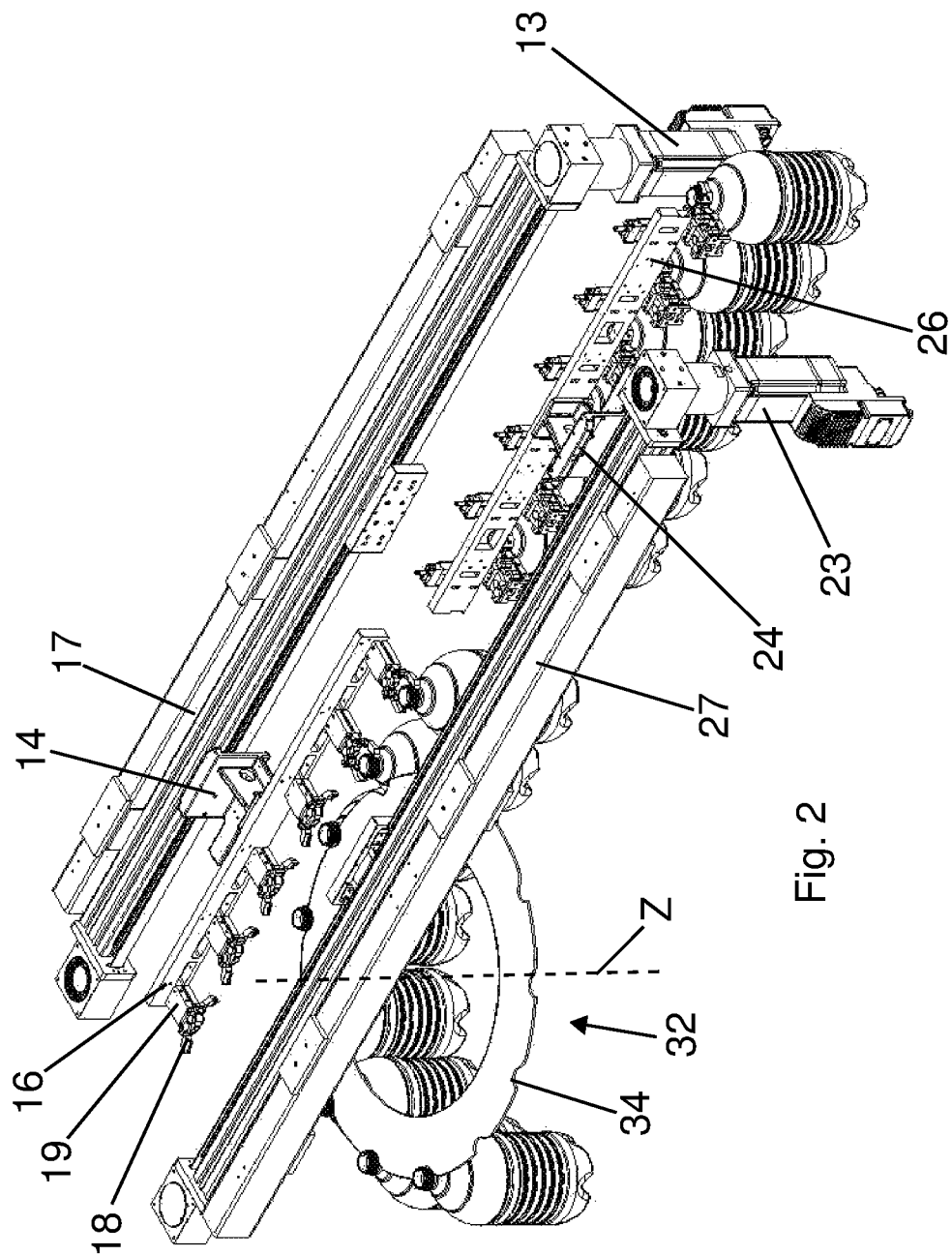
FIG. 2 shows a first perspective view of part of the system in FIG. 1.
Figure 3:
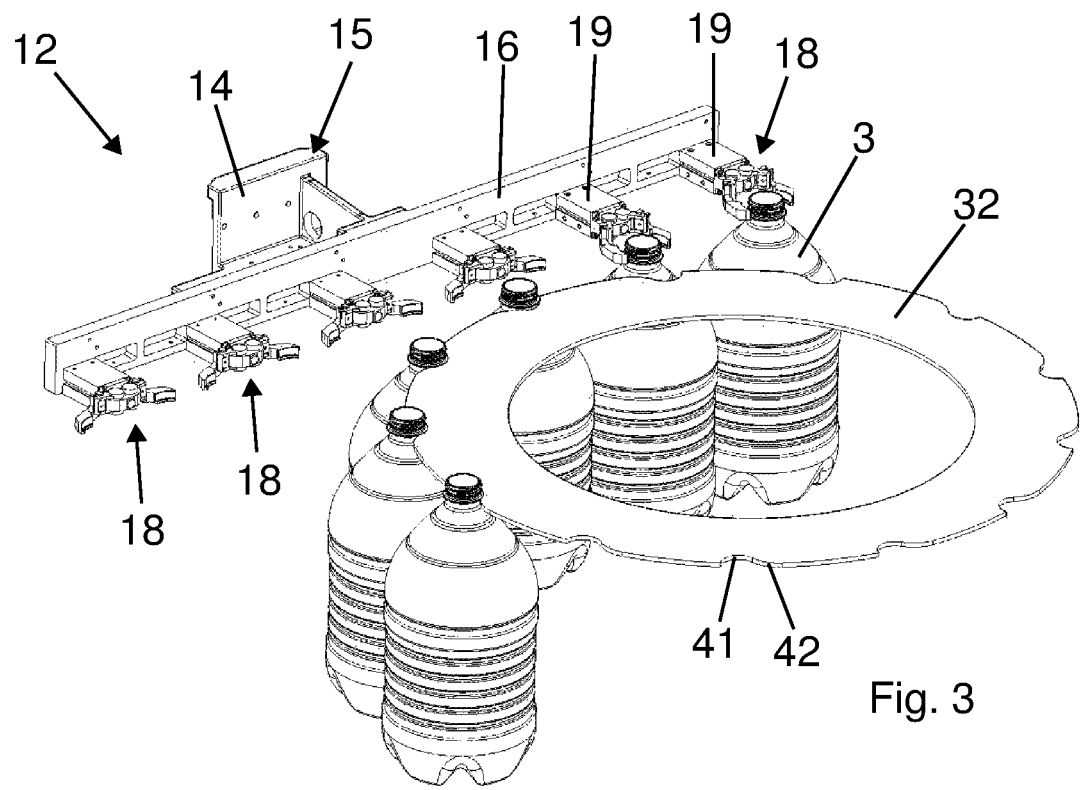
FIG. 3 shows a second perspective view of part of the system in FIG. 1.

A first embodiment of a transfer system 1 for transferring thermoplastic containers from a linear operating machine to a rotary operating machine (both not illustrated) is illustrated with reference to the Figures from 1 to 11.

In particular, the system of the invention can be used to transfer bottles 3 exiting from a linear blowing machine, with which the bottles were made, to a rotary filling machine, in which the bottles are filled with a liquid, e.g. water.

Typically, the bottles have a neck provided with a ring, also known as neck ring, and are made of thermoplastic material, e.g. polyethylene terephthalate (PET).

The zone downstream of the linear blowing machine is called picking zone A, or blowing machine outlet zone. A linear transfer device 2, which for descriptive purposes is also called first linear transfer device 2, is provided downstream of the linear blowing machine.

The first linear transfer device 2 has a movable part 5 comprising a carriage 4 slidingly constrained to a rail 7, so that the movable part 5 can move along a rectilinear axis X. In particular, the first linear transfer device 2 can move from the picking zone A to an exchange zone B. Appropriate actuation means (not illustrated), e.g. a motor, are provided to move the carriage 4 of the first linear transfer device 2.

In addition to the carriage 4, the movable part 5 of the first linear transfer device 2 comprises a longitudinal plate 6, arranged along the axis X, and retaining means 8.

In particular, the plate 6 is fixed to the carriage 4, which is provided with a plurality of retaining means 8 to which the necks of the bottles 3 exiting from the linear blowing machine are constrained. Preferably, the carriage 4 is arranged at approximately half the longitudinal extension of the plate 6 along axis X.

The retaining means 8 are preferably gripping devices, e.g. chucks, which are inserted in the neck of the bottle, although retaining means of other type may be provided. Each retaining means 8 is configured to retain a respective bottle 3, as shown for example in FIG. 1. The retaining means 8 are mutually equal, aligned along axis X and distanced by a predetermined pitch, or center distance, equal to the pitch of the linear blowing machine. Six retaining means 8 are provided in this embodiment, although a different number of retaining means may be provided, e.g. two, three, four, five or more than six retaining means.

The zone in which the rotary filling machine is arranged is called unloading zone C, and the aforesaid exchange zone B is provided between the picking zone A and the unloading zone C (FIG. 1). A wheel 32, or star, on which the bottles to be filled are arranged, is provided in the unloading zone C. The periphery of wheel 32 is shaped so that it is provided with seats 34 for the bottles, in particular a seat for each bottle. Seats 34 are recessed with respect to the outer edge, or profile, of wheel 32 and are preferably shaped so that the neck ring of the bottle abuts against the upper face of the wheel at seats 34, so that the bottles remain suspended.

Preferably, the transfer system, in all its embodiments, comprises a guide 35, or outer guide, arranged at least partially along the periphery of the wheel 32, so that the containers remain suspended by means of wheel 32 and by means of the guide 35. Preferably, the guide 35 comprises at least one curved stretch, which substantially follows the outer edge of wheel 32 and optionally also comprises a rectilinear stretch.

For example, wheel 32 is provided with an outer guide 35 (FIG. 13), arranged at least partially along the periphery of wheel 32, which supports the neck of the bottles once they enter into wheel 32. Therefore, the bottles remain suspended on wheel 32, one part of their neck being supported by the respective seat 34, and the other part of the neck being supported by the outer guide 35, not shown in the FIGS. 1-12 for a better visibility of other components.

Seats 34 are equally spaced apart with a pitch which is either equal or different, e.g. greater, than the pitch of the retaining means 8 of the linear transfer device 2.

Wheel 32 can rotate about an axis Z, which is a rotation axis perpendicular to the axis X. In the embodiment shown, the rotation occurs anticlockwise and the axis Z passes through the center of wheel 32.

In this first embodiment, two further linear transfer devices are provided arranged one in front of the other. The further two linear transfer devices are called distal linear transfer device 12 and proximal linear transfer device 22 with respect to the rotation axis Z of wheel 32.

The distal linear transfer device 12 and the proximal linear transfer device 22 are provided with a respective movable part 15, 25 comprising a carriage 14, 24, a longitudinal plate 16, 26, parallel to axis X, and gripping means 18, 28.

In particular, carriage 14, 24 has the respective plate 16, 26 fixed thereto, which plate is provided with a plurality of gripping means 18, 28 which grip the necks of the bottles which are at the exchange zone B.

Preferably, the proximal linear transfer device 22 is arranged above the wheel 32, more in detail, preferably, the proximal linear transfer device 22 is arranged above a plane defined by wheel 32.

Preferably, each carriage 14, 24 is arranged approximately at half of the longitudinal extension of the respective plate 16, 26 along axis X. Each carriage 14, 24 is slidingly constrained to a respective rail 17, 27 so that the movable parts 15, 25 can move along axis X. In particular, each carriage 14, 24 slides along an axis thereof parallel to axis X.

Preferably, rail 27 of the proximal linear transfer device 22 is superimposed on the diameter of action of wheel 32, in particular the wheel 27 crosses the diameter of action of wheel 32 and is arranged above the wheel 32 itself. The movable part 25 of the proximal linear transfer device 22, when it is in the unloading zone C (FIGS. 4, 5), is at least partially within the dimension of wheel 32, i.e. partially within said diameter of action and above said wheel.

Instead, the rail 17 of the distal linear transfer device 12 is not superimposed on the diameter of action of wheel 32, i.e. is arranged completely outside wheel 32. The movable part 15 of the distal linear transfer device 12, when it is in the unloading zone C (FIGS. 1-3), is outside the dimension of wheel 32, or in other words is radially outside wheel 32, i.e. outside said diameter of action.

Preferably, the distal linear transfer device 12 and the proximal linear transfer device 22, and thus their rails 17, 27, are installed on a dedicated frame, arranged between the linear blowing machine and the rotary filling machine. The first transfer device 2 is preferably connected to the linear blowing machine.

Appropriate actuation means are provided, preferably respective independent actuation means, in order to move the carriage 14 of the distal transfer device 12 and the carriage 24 of the proximal transfer device 22.

In a preferred variant, the gripping means 18, 28, associated with the plates 16, 26 of the linear transfer devices 12, 22, are grippers, each gripper being configured to externally grasp the neck of one of the bottles 3, retained by the retaining means 8 of the linear transfer device 2, in the exchange zone B. The number of grippers 18, 28 of each linear transfer device 12, 22 is equal to the number of retaining means 8 of the first linear transfer device 2. Furthermore, the grippers 18, 28 of each linear transfer device 12, 22 are aligned along a respective axis parallel to the axis X and are distanced between them with a pitch equal to the pitch of the retaining means 8 of the first linear transfer device 2. Typically, when the first linear transfer device 2 and the distal linear transfer device 12 are in the exchange zone B, each gripping means 18 is either aligned with or faces respective retaining means 8, along a respective axis parallel to axis Z.

Each gripper 18, 28 comprises an arm 19, 29 (FIGS. 3, 4), which is constrained to the respective plate 16, 26 and extends in distal direction with respect to the respective carriage 14, 24. Arm 19, 29 is provided with two jaws or claws hinged thereto, so as to form a gripper. The jaws can be moved away or towards each other so that grippers 18, 28 are open or closed. In particular, when grippers 18, 28 are in closed position, i.e. in gripping position of the bottle neck, their jaws are aligned along the same axis X (FIG. 1). This means that the first linear transfer device 2, the distal linear transfer device 12 and the proximal linear transfer device 22 are configured so that the bottles constrained to the gripping means 18, 28 and the bottles constrained to the retaining means 8 are substantially aligned along the same axis X.

Advantageously, actuation means (not shown), configured to actuate an opening and a closing of each gripper singularly, preferably interdependently from each other, are provided for grippers 18, 28. For example, such actuation means can be a pack of electro-valves or other electrically and/or pneumatically controlled means. In the case of pneumatically controlled means, the pneumatic supply can occur through the plate. This independent configuration of the grippers is needed to allow in particular the opening of each single gripper at the moment of release of the container into the respective seat 34 of wheel 32.

Figure 4:
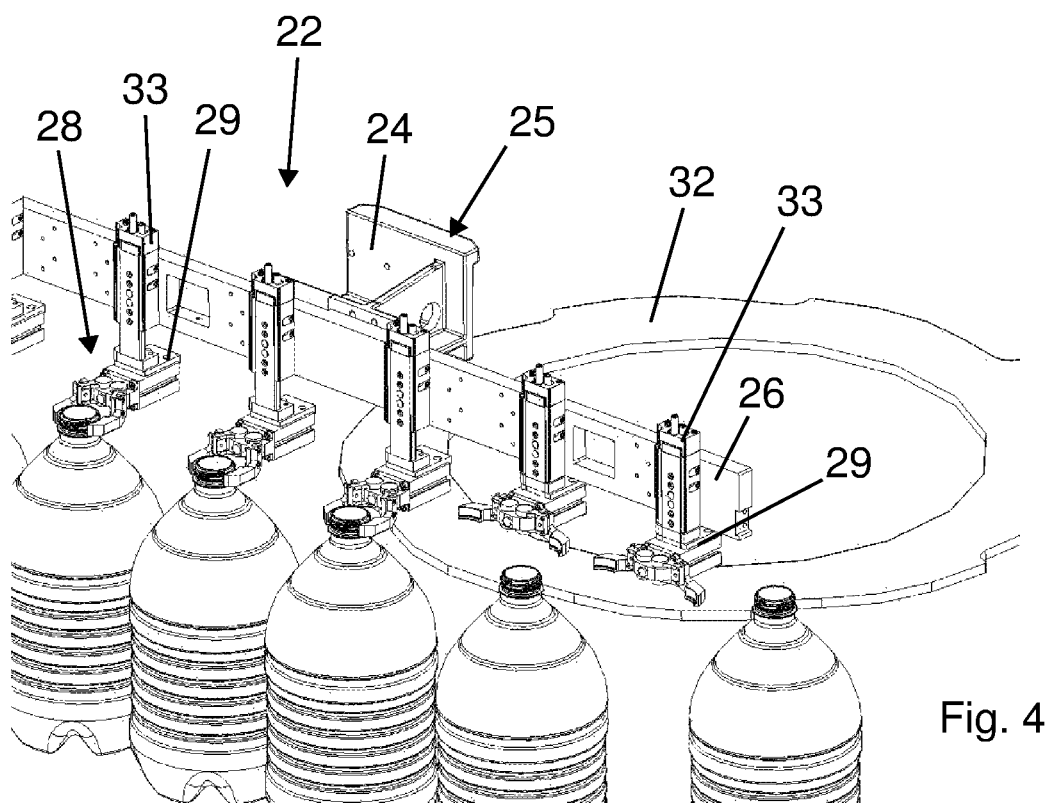
FIG. 4 shows a perspective view of part of the system in FIG. 1 in a second operating position.
Figure 5:
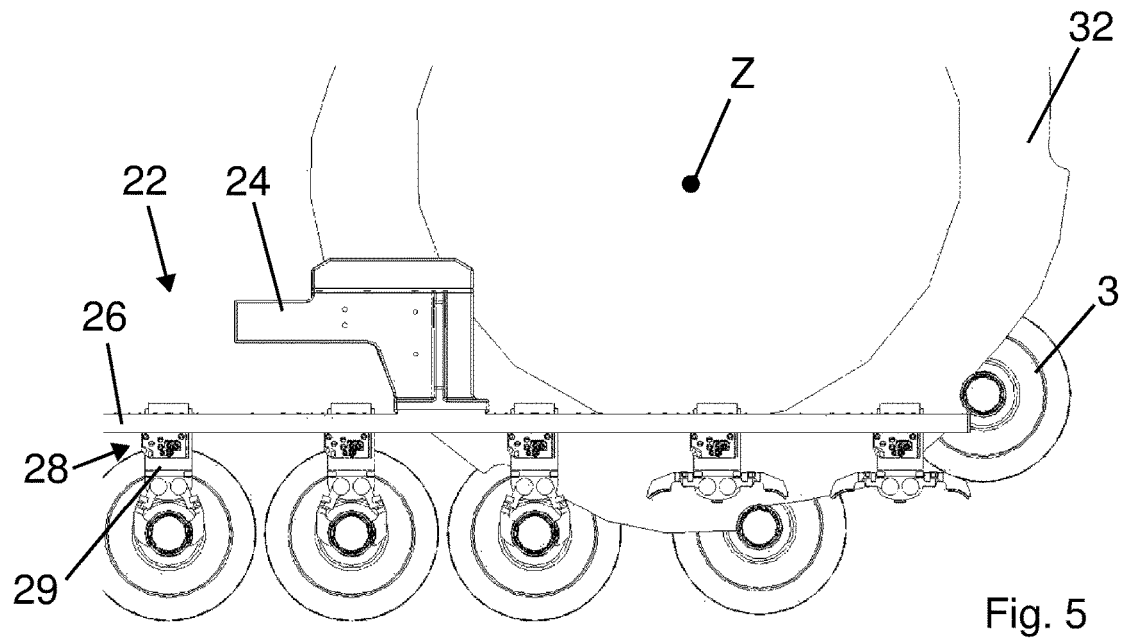
FIG. 5 shows a top view of the system part in FIG. 4.
Figure 6:
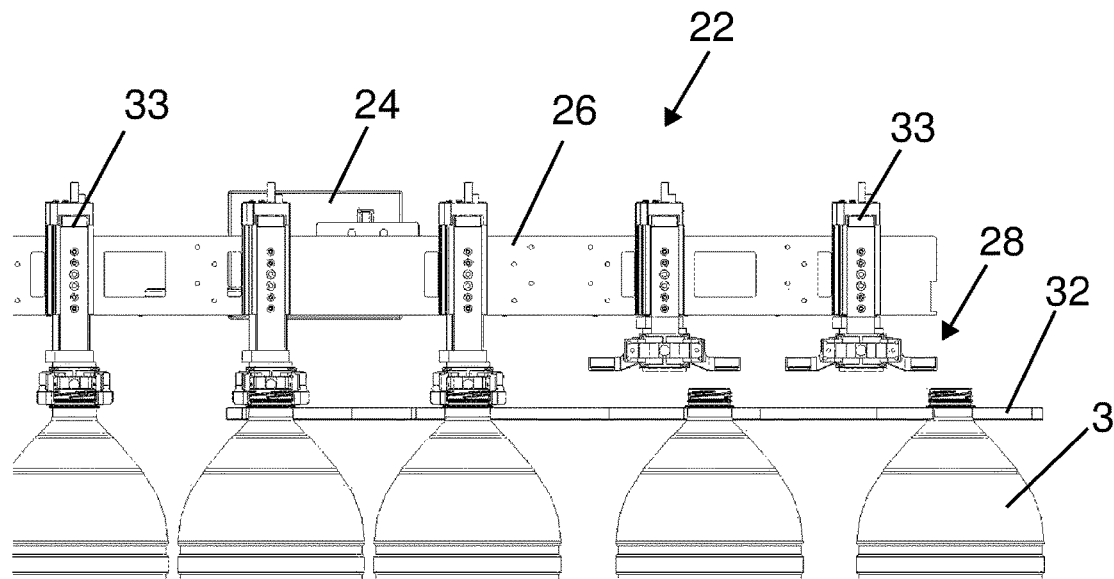
FIG. 6 shows a front view of the system part in FIG. 4.

Preferably, the grippers 28 of the proximal linear transfer device 22 are constrained to respective actuation means, e.g. a cylinder 33, which also allow the translation parallel to the axis Z of each gripper 28 individually (FIG. 4, 5, 6). In particular, cylinders 33 make it possible to lift grippers 28 immediately after having released the bottle from the respective seat 34 of wheel 32.

Figure 10:
FIG. 10 and FIG. 11 show a top view and a perspective view of a particular variant of the system in FIG. 1, respectively.
Figure 11:
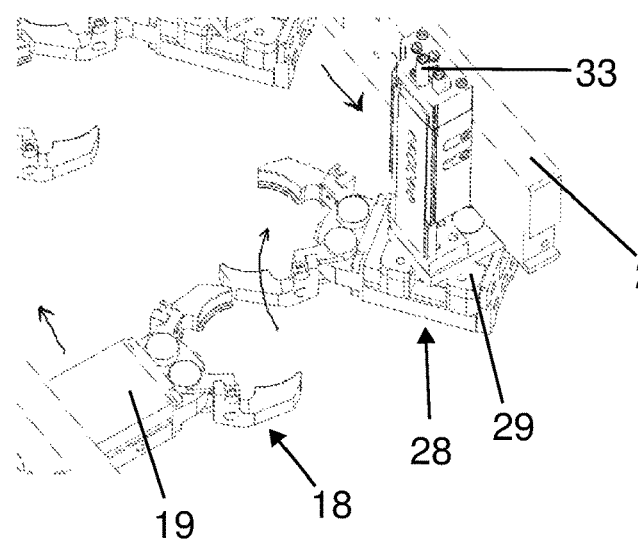

Preferably, with particular reference to FIGS. 10 and 11, the grippers 28 of the proximal linear transfer device 22 are constrained to the plate 26 so as to be able to rotate about an axis parallel to axis Z in case of collision with the grippers 18 of the distal linear transfer device 12. In particular, the collision may accidentally occur during the translation of the movable parts 15, 25 in mutually opposite direction. For example, grippers 28, in particular by means of their arms 29, are singularly hinged to the plate 26. Preferably, sensor means (not shown), e.g. photocells, are also provided to detect the position of grippers 28, in particular to detect whether one or more grippers are rotated with respect to the working position wherein, in this embodiment, the arms arranged substantially perpendicular with respect to the plate. If one or more grippers 28 are rotated because of a collision, the sensors send a signal which blocks the transfer system. In this manner, a safety system is advantageously provided to avoid malfunctions and damage to the components of the transfer system 1.

Either alternatively or additionally, the distal linear transfer device 12 can be provided with the aforesaid safety system, with grippers 18 constrained to the plate 16 so as to be able to rotate about an axis parallel to axis Z.

The rotation of grippers 28 about an axis thereof parallel to axis Z, in addition to the case of collision with grippers 18, can also be provided if gripper 28 is not lifted immediately after having released the container from the respective seat 34 of wheel 32.

The embodiment just described is particularly but not exclusively apt to transfer containers, in particular bottles, having a capacity comprised between 0.1 and 12 liters.

This system of the invention can be used in the case of blowing machines with two, three, four, five, six or more cavities.

Figure 12:
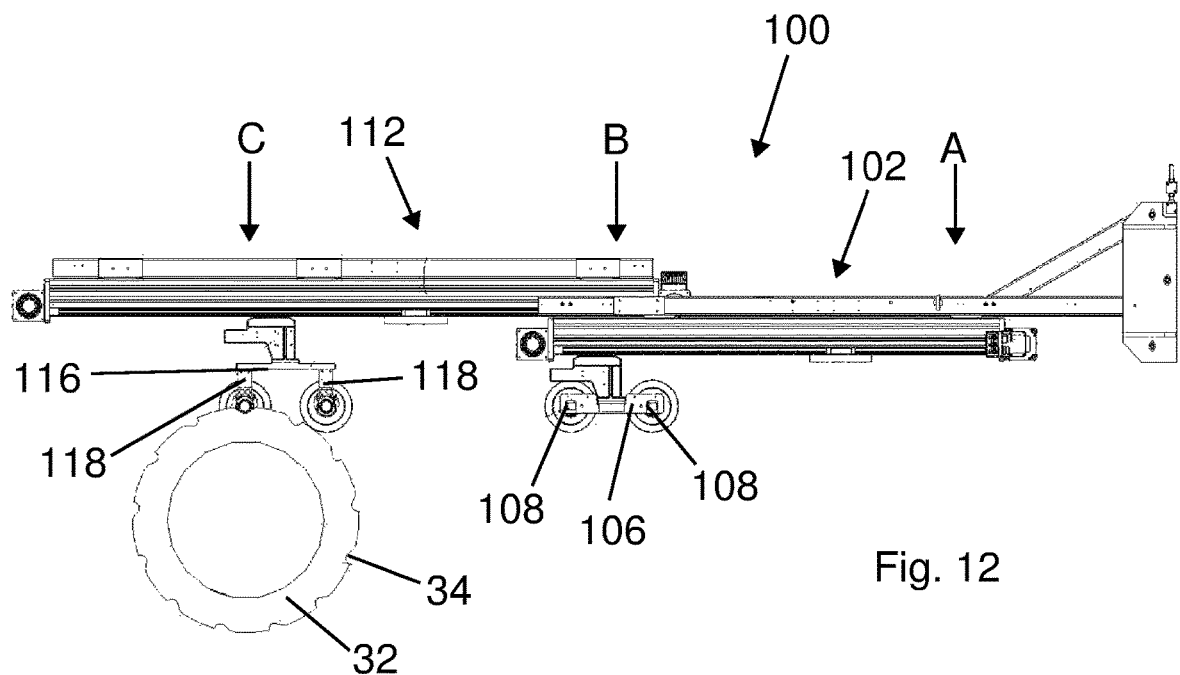
FIG. 12 shows a top plan view of a second embodiment of the transfer system of the invention.
Figure 13:
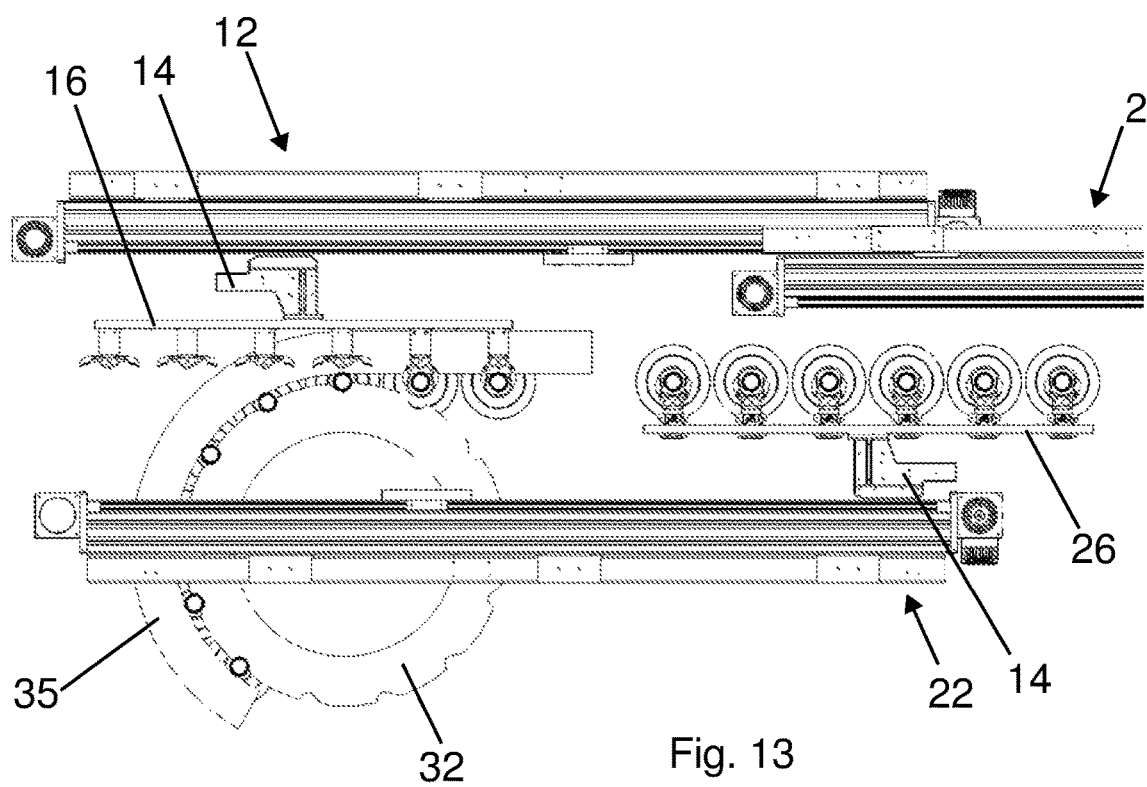
FIG. 13 shows a top plan view of a variant of the invention.

With reference to FIG. 12, in a second embodiment of the invention, the transfer system 100 is identical to the transfer system 1 of the first embodiment, except for the differences described below. For this reason, the parts in common between the two embodiments, including any variants, will not be described further.

Unlike the transfer system 1 of the first embodiment, the transfer system 100 comprises the first linear transfer device 102 and only one further linear transfer device 112, preferably equivalent to the distal linear transfer device 12 of the first embodiment. The further linear transfer device is called second linear transfer device 112 for descriptive purposes. In this second embodiment, two or more retaining means 108 and two or more gripping means 118, in particular two or more grippers, are respectively constrained to the plates 106, 116 of the linear transfer devices 102, 112. Indeed, this embodiment can be used in the case of blowing machines with two or more cavities and longer blowing time.

Indeed, in this case, the blowing cycle time, which elapses between one container molding and the next, can cover the time that the second linear transfer device 112 takes to pass from the unloading zone C to the exchange zone B; take the two or more blown containers from the retaining means 108, typically chucks, of the first linear transfer device 102; and return to the unloading area C, unloading the containers into wheel 32.

This second embodiment is more simple and cost-effective, there being provided only one second linear transfer device.

For both embodiments, in case of a pitch of the linear blowing machine equal to the pitch of the rotary filling machine, i.e. when the pitch of the grippers 18, 28, 118 of the second linear transfer devices is equal to the pitch of the seats 34 of wheel 32, these seats 34 have a substantially semicircular shape and the advancement speed of the second linear transfer device towards wheel 32 is equal to the tangential speed of wheel 32. In this case, a bottle 3 is released when a gripper 18 or 28 is at a respective seat 34. As wheel 32 is rotating and the second linear transfer device translates, after a gripper has transferred the bottle into a respective seat, the next seat and next gripper will mutually correspond so as to be able to transfer another bottle, and so forth. The bottles are then gradually unloaded from wheel 32, so that seats 34 are again available to receive additional bottles. Advantageously, by providing actuation means for opening and closing each gripper 18, 28 individually, the opening of each gripper, and thus the releasing of the respective bottle, is allowed when the gripper 18, 28 is located at a respective seat 34.

Instead, in case of a pitch of the linear blowing machine different from the pitch of the rotary filling machine, i.e. when the pitch of the grippers 18, 28, 118 of the second linear transfer devices is different from the pitch of the seats 34 of wheel 32, the advancement speed of the second linear transfer device towards wheel 32 is different from the tangential speed of wheel 32. Two alternative solutions are provided in order to ensure the synchronism between the second linear transfer device and the wheel, avoiding undesired interferences between bottles 3 and wheel 32.

A first advantageous variant provides that seats 34 are shaped so that the periphery of wheel 32 has a sawtooth-shaped profile, in order to allow the arrangement of the container in the respective seat 34 without interference.

Preferably, the profile of the periphery of wheel 32 at each seat 34 comprises a first curved stretch 41 and a second curved stretch 42 (indicated in FIG. 3) adjacent to the first curved stretch 41, and wherein there is an inflection point between the first curved stretch and the second curved stretch. In other words, the concavity of the first curved stretch 41 is different from that of the second curved stretch 42. Preferably, part of the neck of a bottle is in contact with the outer surface of the first curved stretch 41.

Preferably, the radius of curvature of the first curved stretch 41 is between 12 and 25 mm, e.g. between 15 and 22 mm; and the radius of curvature of the second curved stretch 42 is between 180 and 220 mm, preferably between 190 and 210 mm, e.g. 200 mm.

For example, viewed in plan from above, the profile of wheel 32 is shaped so that, starting from a point of the periphery where the external diameter of wheel 32 is maximum, there is an inlet with a first curved stretch 41, so that the outer diameter of wheel 32 decreases. The first curved stretch 41 is followed by another stretch 42, preferably curved or curved-linear, with which the outer diameter of the wheel increases until it reaches another point in which the outer diameter is maximum again. At least the first curved stretch 41 defines a seat 34. An inflection point is preferably provided between the two stretches 41, 42. A second advantageous variant envisages, instead, speed modulating means to modulate the advancement speed of the second linear conveyor 12, 22, 112 at the unloading zone C so that there will always be a gripper 18, 28, 118 in the tangency point between the second transfer device and wheel, perfectly corresponding to a seat 34 without any interference between bottle and edge of the wheel.

In other words, if seats 34 are equally spaced apart by a pitch which is different from the pitch of the at least one second linear transfer device, the transfer device system comprises speed modulating means to modulate the advancement speed of said at least one second linear transfer device 12, 22, 112 at said unloading zone C so that gripping means 18, 28, 118 will always perfectly correspond to a seat 34 in the tangency point between said at least one second transfer device and said wheel.

Indeed, it has been found advantageous to suitably adjust the translation speed of the second linear transfer device using appropriate actuation means. Preferably, actuation means are used which allow a continuous control of the speed and of the position of the respective transfer device, such as for example brushless motors 13, 23, although different actuation means may be used, e.g. synchronous motors with permanent magnets or three-phase asynchronous motors.

In particular, the speed can be modulated at the tangency point, so as to be able to deposit the bottles in the wheel maintaining a common peripheral speed at the time of release of the bottle. In this way, there is an operation which, for example, provides continuous decelerations and accelerations (if the gripper pitch is smaller than the filling pitch) to maintain a correct synchronism between second linear transfer device and wheel.

By providing actuation means of the linear transfer devices 12, 22 which allow a continuous control of the transfer speed and position it is therefore possible to have a fast advancement to reach the unloading zone C and then continue with a tracking at a speed suited to that of the wheel in order to allow the release of the bottles in wheel 32.

After having provided an exemplifying structural description of transfer systems by way of example, the invention will be better understood and its advantages will be appreciated more in the light of the following detailed description of operation of the transfer system. The invention thus also provides a method for transferring thermoplastic material containers from a linear operating machine to a rotary operating machine.

In general, the method comprises the steps of:
a) picking the containers by means of the first linear transfer device 2, 102 in the picking zone A,
b) translating the first linear transfer device 2, 102 to position it in the exchange zone B,
c) translating the at least one second linear transfer device 12, 22, 112 to position it in the exchange zone B,
d) picking the containers from the first linear transfer device 2, 102 by means of the at least one second linear transfer device 12, 22, 112,
e) translating the at least one second linear transfer device 12, 22, 112 to position it in the unloading zone C,
f) transferring the containers from the at least one second linear transfer device 12, 22, 112 to wheel 32,
g) translating the first linear transfer device 2, 102 to position it in the picking zone A and repeating from step a).

The steps of the method are not necessarily performed in sequence, some steps may be performed at the same time.

In particular, in steady state condition the time during which steps e), f) and c) are performed in sequence is substantially equal to the time during which steps g), a) and b) are performed in sequence.

When two second linear transfer devices 12, 22 are provided, as in the first embodiment, these alternate in sequence between the exchange zone B and the unloading zone C to transfer the containers from the linear operating machine to rotary operating machine, in particular from the first linear transfer device to the wheel.

Figure 8:
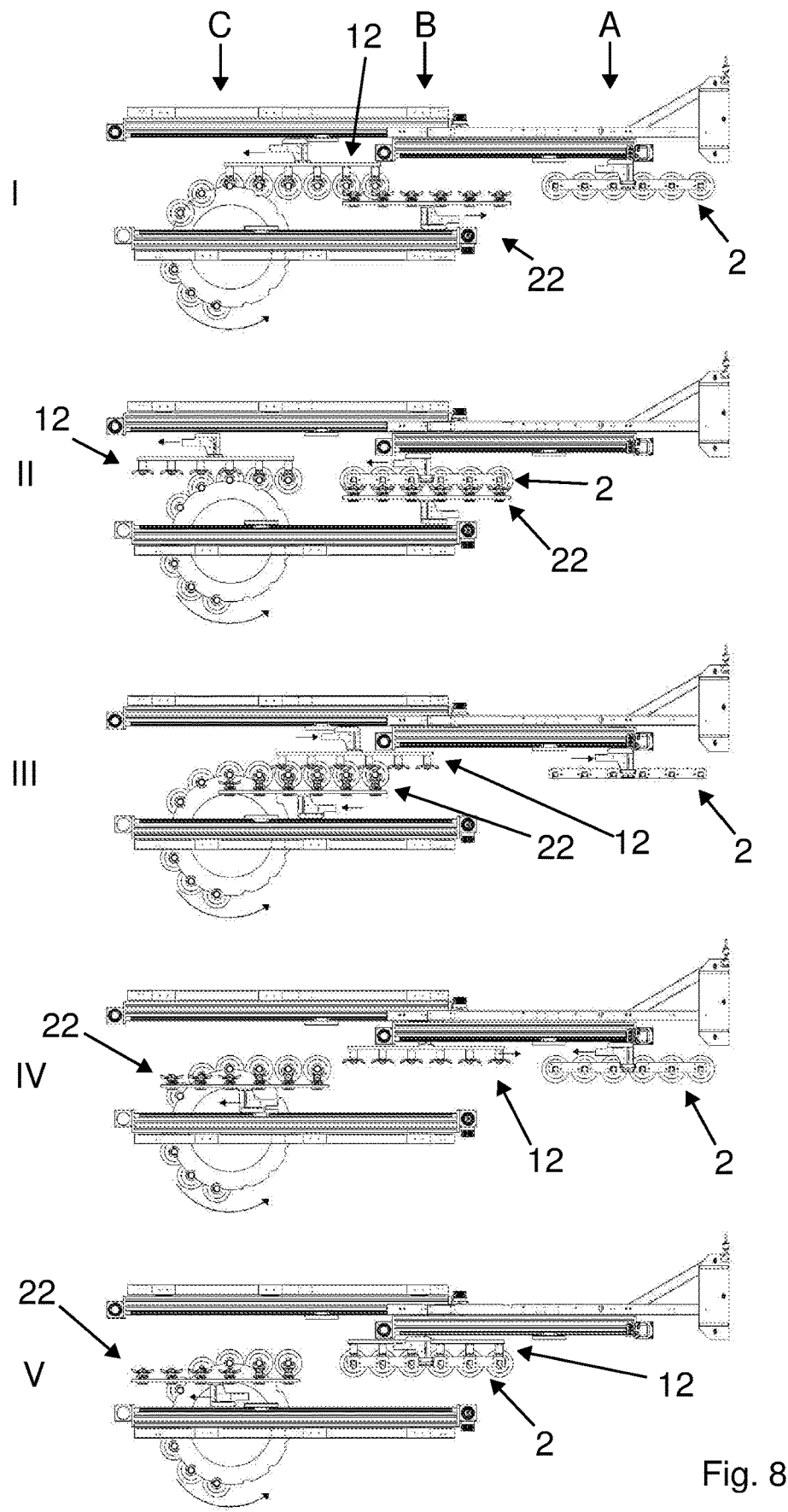
FIG. 8, from I) to V), shows a sequence of operations which occurs during the operation of the system of the invention.
Figure 9:
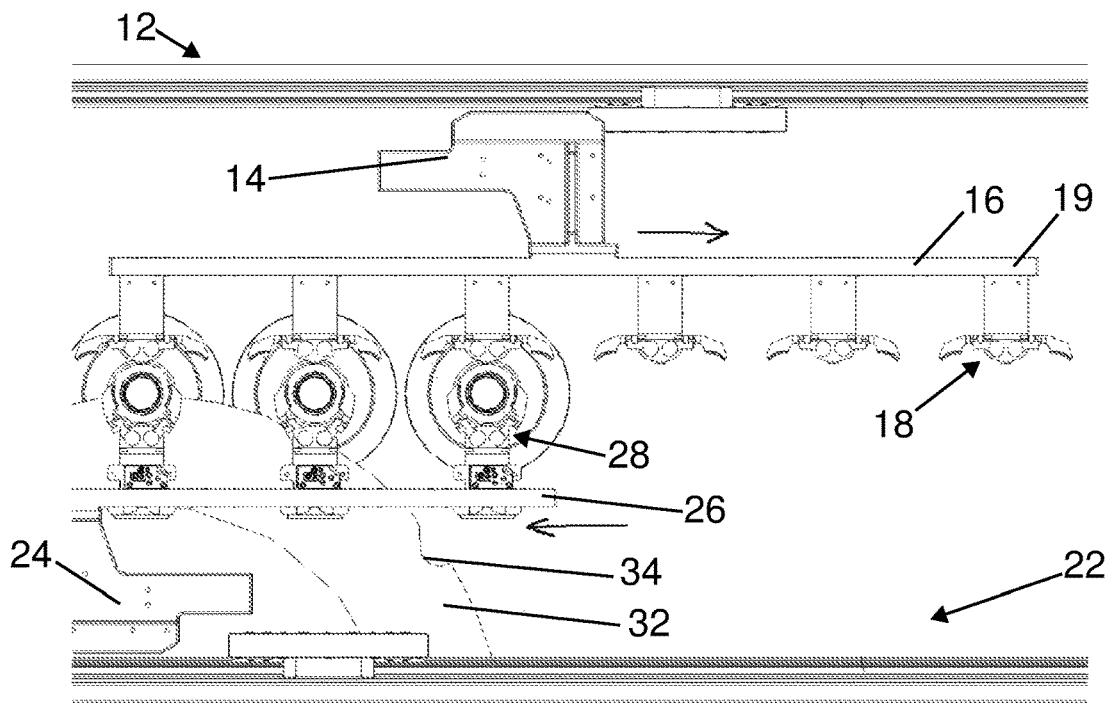
FIG. 9 shows a top view of the system in FIG. 1.

With reference to the first embodiment and to FIG. 8, an example of the cyclic operation of the system is described starting from when a first series of bottles is grasped by the gripping means 18 of the distal linear transfer device 12.

I) In this condition, the distal linear transfer device 12 translates toward wheel 32 and begins to transfer the bottles to wheel 32. At the same time, the proximal linear transfer device 22, without bottles, translates starting from wheel 32 until it reaches the exchange area B, and the first linear transfer device 2 picks a second series of bottles in the picking area A.

II) Next, the first linear conveyor 2 translates until it reaches the exchange area B, and the second series of bottles is transferred to the proximal linear transfer device 22. In the meantime, the distal linear transfer device 12 is still transferring the first series of bottles to wheel 32.

III) After the distal linear transfer device 12 has transferred all the bottles of the first series in wheel 32, it translates performing the return travel to the exchange zone B. In the meantime, the proximal linear transfer device 22 translates toward wheel 32 and starts transferring the bottles of the second series to wheel 32, while the first linear transfer device 2 translates, without bottles, performing the return travel until it reaches the picking position A.

IV) Then, the first linear transfer device 2 takes a third series of bottles in the picking area A to take it to the exchange zone B, while the proximal linear transfer device 22 is still transferring the second series of bottles to wheel 32 and the distal linear transfer device 12 is about to reach the exchange area B.

V) Then, the first linear transfer device 2 moves until it reaches the exchange area B, taking the third series of bottles to the position to be picked by the distal linear transfer device 12, which has reached the exchange position B. In the meantime, the proximal linear transfer device 22 is still transferring the second series of bottles to wheel 32.

After the proximal linear transfer device 22 has transferred all the bottles of the second series in wheel 32, and the first linear conveyor 2 has returned to the picking area A, the cycle continues restarting from step I).

Advantageously, the proximal linear transfer device 22 and the distal linear transfer device 12 work alternately to provide a continuous and constant feeding flow to the wheel.

The bottles are transferred from the first transfer device 2 to the distal linear transfer device 12 or to the proximal linear transfer device 22 in an exchange position, within the exchange zone B, in which the retaining means 8 face each other at the respective grippers 18 or at the respective grippers 28.

Figure 7:
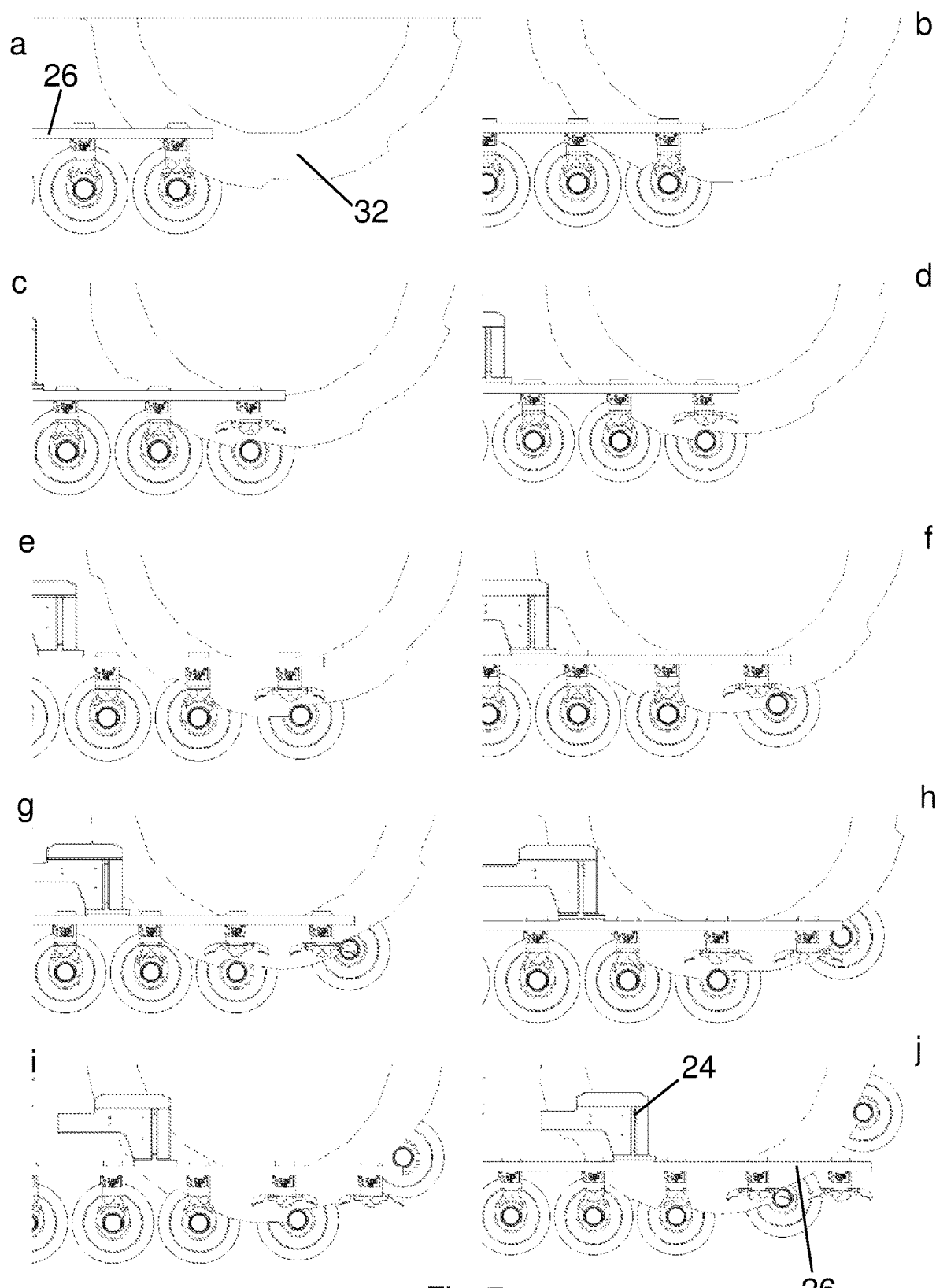
FIG. 7, from a) to j), shows a sequence of an operation which occurs during the operation of the system of the invention.

The bottles are transferred from the distal linear transfer device 12 or from the proximal linear transfer device 22 to wheel 32, with particular reference to FIG. 7, in a sequential manner, meaning that grippers 18 or 28 release the bottles in sequence into seats 34 of wheel 32.

With reference to FIG. 4, 5, 6, in order to avoid any interference between each gripper 28 of the proximal linear transfer device 22 and the necks of the bottles already deposited in wheel 32, it is advantageously provided that each gripper 28 moves up and away from wheel 32 after releasing the respective bottle. This is advantageous because, as previously mentioned, the proximal linear transfer device 22 is positioned above wheel 32, so that the necks of the bottles already deposited in wheel 32, in their circular advancement, may interfere with grippers 28 advancing in a linear manner. Raising the gripper 28 immediately after releasing the bottle, in particular for a travel greater than the maximum height of the neck which can be handled, make it possible to avoid this possible interference. This problem does not apply in the case of the distal linear transfer device 12 because it is positioned outside the dimension occupied by wheel 32 and the bottles released into the wheel do not interfere with the linear movement of grippers 18 (see for example FIG. 3).

In the normal operation of the transfer system, once the bottles are released, grippers 18, 28 remain open until they grasp the successive bottles in the exchange zone B. In particular, the proximal and distal linear transfer devices perform the respective return travel toward the exchange zone B with grippers 18, 28 open. Of course, in their forward travel toward wheel 32, the grippers are closed around the neck of the respective bottle.

Therefore, in the aforesaid normal operating conditions, when one of the two second linear transfer devices, e.g. the proximal linear transfer device 22, translates without bottles towards the exchange zone B, grippers 28 are open, while the grippers 18 of the distal linear transfer device 12, which is taking the bottles towards wheel 32, are closed. In this manner, there will be no interferences or collisions between the claws of the grippers 18, 28 of the two linear transfer devices 12, 22 which advance in mutually opposite direction. However, in case of technical fault, the grippers of one of the two linear transfer devices 12, 22 could be closed during the return travel toward the exchange zone B. When the transfer system is designed with the two transfer devices 12, 22 which are very near, this would lead to a collision between the claws of the grippers 18, 28 of the linear transfer devices. For this reason, it is advantageous to provide the safety system described above. Providing that the grippers of at least one of the two linear transfer devices 12, 22 are pivoted, in case of accidental collision they may detach and rotate about themselves, so that they do not cause damage to the grippers or other components of the transfer device system.

With reference to the second embodiment, the operation of the transfer system 100 is similar to that of the transfer system 1, obviously taking into account that only one second linear transfer device 112 is provided. Since this embodiment is particularly apt for large size containers, it must be considered that the blowing time for producing the bottles and the filling time of the bottles is greater than the time required for small size bottles. Therefore, having a second linear transfer device 112 is sufficient to have high transfer cycle speeds. Indeed, in this case, the blowing cycle time, which elapses between one container molding and the next, can cover the time the second transfer device takes to return to the exchange zone B, taking the two or more containers and returning to the unloading zone C.

After having provided a description of the transfer system and of the method according to the invention by way of example, we want to clarify that in order to prevent erroneous or limitative interpretations of the invention, we are omitting further clarifications which we assume are unnecessary for a person skilled in the art.

In particular, when it is described that a linear transfer device "translates", it is meant that its movable part translates.

Although the transfer system has been described with reference to bottles, containers of other type may be used, e.g. preforms for bottles.

Furthermore, the operation of the transfer system which has been described is only a non-limiting example.

The invention claimed is:

1. A transfer system or transferring thermoplastic material containers from a linear operating machine to a rotary operating machine, comprising
 a first linear transfer device apt to pick the thermoplastic material containers from the linear operating machine in a picking zone and to translate along a first axis from said picking zone to an exchange zone, and vice versa,
 a wheel apt to cooperate with the rotary operating machine peripherally provided with seats for the thermoplastic material containers, and apt to rotate about a second axis perpendicular to the first axis,
 at least one second linear transfer device apt to pick the thermoplastic material containers from the first linear transfer device in said exchange zone, and to transfer them to said seats, said at least one second linear transfer device being apt to translate parallel to said first axis from the exchange zone to an unloading zone proximal to the wheel, and vice versa,
 wherein the first linear transfer device is provided with retaining means for retaining the thermoplastic material containers and the at least one second linear transfer device is provided with gripping means for picking the thermoplastic material containers from corresponding retaining means in the exchange zone, said retaining means being equally spaced apart by a first pitch equal to the pitch of said gripping means,
 wherein the seats are equally spaced apart by a second pitch which is different from said first pitch,
 and wherein the seats are shaped so that a periphery of the wheel has a sawtooth-shaped profiler wherein a profile of the periphery of the wheel at each seat comprises a first curved stretch and a second curved stretch adjacent to the first curved stretch, and wherein there is an inflection point between the first curved stretch and the second curved stretch.

2. The transfer device system according to claim 1, wherein the gripping means of the at least one second linear transfer device are grippers.

3. The transfer system according to claim 2, wherein there are provided actuation means configured to actuate an opening and a closing of each gripper of said grippers individually, preferably in mutually independent manner, so that each gripper is apt to be opened when a thermoplastic material container of said thermoplastic material containers is released into a respective seats.

4. The transfer system according to claim 1, wherein said retaining means are aligned along the first axis and said gripping means are aligned parallel to the first axis, whereby the gripping means face respective retaining means (8, 108) when the first linear transfer device and the at least one second linear transfer device are in the exchange zone.

5. The transfer device system according to claim 1, wherein there are provided two second linear transfer devices apt to translate parallel to each other and consisting of a distal linear transfer device and a proximal linear transfer device with respect to the second axis.

6. The transfer system according to claim 5, wherein there are provided actuation means configured to actuate individually each of said gripping means of the proximal transfer device parallel to the second axis.

7. The transfer system according to claim 5, wherein the distal linear transfer device and the proximal linear transfer device comprise a respective plate to which respective gripping means of said gripping means are constrained, and wherein the gripping means of the distal linear transfer device and/or of the proximal linear transfer device are preferably constrained to the plate so as to be able to rotate about a respective axis parallel to the second axis.

8. The transfer system according to claim 5, wherein the proximal linear transfer device is arranged on a plane arranged over a plane defined by the wheel.

9. The transfer system according to claim 1, wherein said thermoplastic material containers are bottles; said linear operating machine is a linear blowing machine; said rotary operating machine is a rotary filling machine configured to fill the bottles with a liquid; wherein said rotary filling machine comprises said wheel.

10. The transfer system according to claim 1, wherein said second pitch is greater than said first pitch.

11. The transfer system according to claim 1, wherein said at least one second linear transfer device is apt to pick the thermoplastic material containers directly from the first linear transfer device in said exchange zone and to transfer them directly into said seats.

12. The transfer system according to claim 1, wherein there is provided a guide arranged at least partially along the periphery of the wheel, so that the containers remain suspended by means of the wheel and by means of the guide.

13. The transfer system according to claim 1, wherein each retaining means of said retaining means is configured to be inserted in a neck of a thermoplastic material_container of said thermoplastic material containers to retain the thermoplastic material_container.

14. A method for transferring thermoplastic material containers from a linear operating machine to a rotary operating machine by means of a transfer system according to claim 1, wherein the method comprises the steps of:
   picking the thermoplastic material containers from the linear operating machine in the picking zone and transferring them along the first axis from said picking zone to the exchange zone by means of the first linear transfer device,
   picking the thermoplastic material containers from the first linear transfer device in said exchange zone and transferring them, by means of the at least one second linear transfer device, into the seats of the wheel rotating about the second axis and cooperating with the rotary operating machine.

15. The method according to claim 14, wherein the following steps are provided in sequence:
   a) picking the thermoplastic material containers by means of the first linear transfer device in the picking zone,
   b) translating the first linear transfer device to position it in the exchange zone,
   c) translating the at least one second linear transfer device to position it in the exchange zone,
   d) picking the thermoplastic material containers from the first linear transfer device by means of the at least one second linear transfer device,
   e) translating the at least one second linear transfer device to position it in the unloading zone,
   f) transferring the thermoplastic material containers from the at least one second linear transfer device to the wheel,
   g) translating the first linear transfer device to position it in the picking zone and repeating from step a).

16. The method according to claim 15, wherein in steady state condition, the time during which steps e), f) and c) are performed in sequence is substantially equal to the time during which steps g), a) and b) are performed in sequence.

17. The method according to claim 14, wherein two linear transfer devices alternate in sequence to transfer the thermoplastic material containers from the linear operating machine to the rotary operating machine.

* * * * *